United States Patent [19]

Dee

[11] 4,018,902

[45] Apr. 19, 1977

[54] COMBINATION CONFECTION AND HOLDER

[76] Inventor: Edward Dee, 45 Georgian Court, Elizabeth, N.J. 07200

[22] Filed: June 30, 1976

[21] Appl. No.: 701,207

[52] U.S. Cl. .............................. 426/75; 24/201 S; 24/230 F; 294/5.5; 426/134

[51] Int. Cl.² ..................... A23G 9/26; A44B 17/00

[58] Field of Search ............ 426/134, 75, 91, 110, 426/389, 421, 101, 139, 565, 143, 144; 294/5.5, 33, 99 R; 24/201 S, 230 F; D1/22, 99, 15-20

[56] References Cited

UNITED STATES PATENTS

| 1,011,416 | 12/1911 | Day | 15/425 |
|---|---|---|---|
| 1,761,495 | 6/1930 | Salmi | 46/58 |
| 1,972,799 | 9/1934 | Schnaier | 426/134 |
| 2,239,793 | 4/1941 | Miller | D19/53 |
| 2,721,141 | 10/1955 | Leinhauser | 426/134 |
| 2,793,842 | 5/1957 | Bacon | 46/47 X |
| 3,761,121 | 9/1973 | Reid | 294/99 R X |
| 3,861,733 | 1/1975 | Van der Mey | 294/33 |
| D215,917 | 11/1969 | Hendrick | D1/22 |

Primary Examiner—Steven L. Weinstein
Attorney, Agent, or Firm—Norman N. Popper

[57] ABSTRACT

A combination confection and holder providing a confectionary slab with a concavity and a holder therefore; the holder has bifurcated resilient arms having opposed convexities which snap fit into the concavities in the confectionary slab, which the arms seize and hold.

1 Claim, 7 Drawing Figures

COMBINATION CONFECTION AND HOLDER

BACKGROUND OF THE INVENTION

1. Field of Invention

This invention relates generally to confectionary items for children, and especially to confections mountable, and demountable from a handle.

2. Prior Art

Confections that are hard enough, or large enough, so that they can only be consumed slowly bit by bit, have been well known for a long time. They are usually provided with rigid handles molded into the body of the confection. Special processing is required to produce such confections affixed to a handle.

The very rigidity of the handle presents a danger for children, who are prone to fall; if they have a confection with a handle in their mouth, the confection may be driven forcibly into the oral cavity, damaging the tissues.

In confections mounted on a stick, the handle sometimes comes loose, and the confection is lost. Yet the attraction of a confection on a stick appears to endure, inspite of the inherent danger in the item, the cost to manufacture it, and the unreliability of the handle to retain the product.

SUMMARY OF INVENTION

It has been found that a combination confection and holder can be made wherein the holder can be cheaply and separately made of inexpensive plastic material. The confection can be molded in the usual manner, with a seat in which the holder is snap-fitted. The safety of this product arises from the detachable character of the holder. The product is inexpensive to manufacture, and easy to assemble. A flat seat on the confection has an aperture into which resilient, bifurcated ends of a holder are applied. A concavity in the confection receives opposing convexities on the resilient ends of the bifurcated handle, to grip the confectionary slab.

THE DRAWINGS

These objects and advantages as well as other objects and advantages may be attained by the device shown by way of illustration in the drawings in which.

PREFERRED EMBODIMENT

Figure 1:
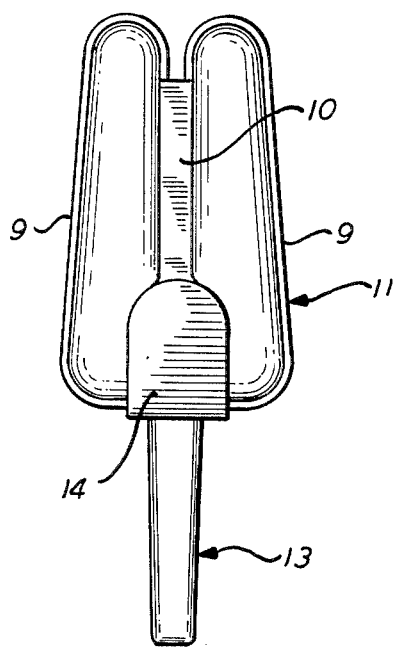
FIG. 1 is a front elevational view of the combination confection slab and holder.
Figure 2:
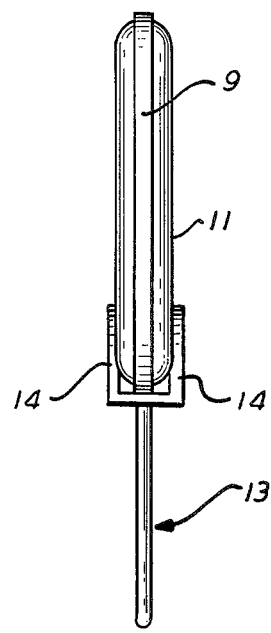
FIG. 2 is a side elevational view thereof.
Figure 4:
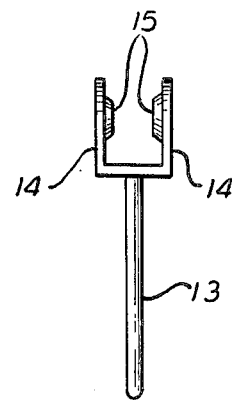
FIG. 4 is a side elevational view of the holder detached from the confectionary slab.
Figure 3:
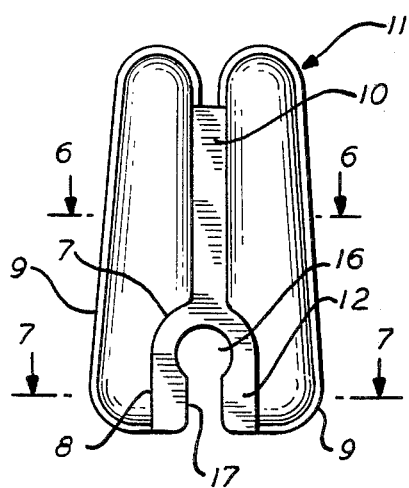
FIG. 3 is a front elevational view of the confection slab disconnected from the holder.
Figure 5:
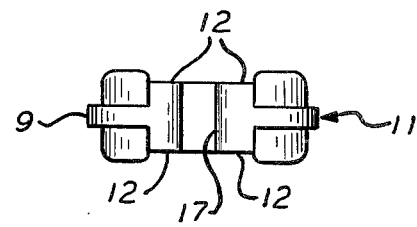
FIG. 5 is a bottom view of the confectionary slab.
Figure 6:
FIG. 6 is a horizontal cross-sectional view taken on the line 6—6 in FIG. 3, looking in the direction of the arrows.
Figure 7:
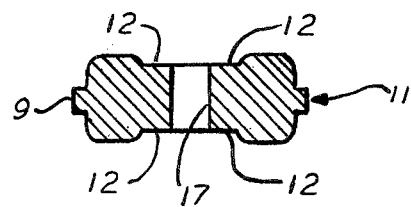
FIG. 7 is a horizontal cross-sectional view taken on the line 7—7 in FIG. 3, looking in the direction of the arrows.

The combination confection and holder provides a confectionary slab 11 which in the embodiment shown in the drawing, has the shape of a pair of tapered confectionary slices joined together lengthwise by a control, longitudinal valley 10, and having peripheral ribs 9. This particular form is largely ornamental for numerous other configurations may be selected.

The slab 11 is provided with central, flat, depressed areas 12 on opposite sides of the slab 11 at one end, and these depressed areas are provided with outside edges 8 which taper slightly toward each other, and are joined by an arcuate top edge 7 which merges with the longitudinal valley 10. These flat depressed area define a seat on both sides of the slab for a handle for the confection.

A handle 13 to hold the slab 11 is provided. The handle may be made of a resilient plastic material. It has bifurcated ends 14 which are deflectable. The ends 14 are spaced apart and normally parallel to each other. They correspond in shape to the depressed areas 12, having side edges which taper toward each other and are joined together by an arcuate top edge; the ends 14 thus fit into the depressed area 12 as shown in FIG. 1. The ends 14 are spaced apart a distance generally corresponding to the thickness of the slab at the depressed area 12, so that they may resiliently grip the slab 11 and seat themselves there, on opposite sides of the slab 11.

In order that the ends 14 may not fall out of the depressed areas 12, a pair of bumps, convexities, or raised areas 15 are formed on the inner surfaces of the bifurcated ends 14 of the handle 13. A seat 16 for the raised areas 15 is formed in the depressed areas 12 on the slab 11. This seat is in the form of a passage through the flat depressed areas 12 and is shaped to receive the raised areas 15, thereby forming an interlock between the handle 13 and the slab 11, so that the ends 14 cannot be slid out of the depressed areas 12 without deflecting and spreading the ends 14, to disengage the raised areas 15 from the seat 16. A channel 17 communicates between the edge of the slab to the seat 16. This channel 17 is narrower than the diameter of the seat 16 to permit the insertion of the raised areas into the seat 16, but nevertheless to hold them therein.

The removable handle 13 permits the consumption of the entire slab 11. In case a child falls with the confection in its moutn, the handle will not jam the confection 11 forcibly into its mouth, for the handle 13 becomes readily disengaged. Confections with long handles deeply imbedded, are a frequent source of severe damage to the oral cavity when a child falls with the confection in its mouth; a rigidly attached handle in contact with the floor drives the confection into the mouth. In the present device the handle and confection are attractive in a form, convenient to hold, and readily disengagable from each other; yet the handle securely holds the confection.

What is claimed:

1. A combination confection and holder comprising
   a. a confectionary slab,
   b. flat, depressed areas on the opposite sides of the slab, and in general registration with each other at one end of the slab defining a seat on both sides of the slab, for a handle,
   c. a handle,
   d. a resilient, bifurcated end on the handle, the bifurcated portions of which are deflectable and normally generally parallel; the bifurcated end defining a confection holder portion of the handle,
   e. the bifurcated portions of the handle spaced apart a distance coequal to the thickness of the slab at the depressed areas of the slab, so that they may resiliently grip the slab and seat themselves on opposite sides of the slab, f. each bifurcated portion shaped in correspondence to the shape of the depressed areas on the slab,
g. the bifurcated portions seated in the depressed areas, on opposite sides of the slab,
h. a raised, opposed area on the inner surface of each of the bifurcated portions of the handle,
i. a passage through the flat depressed areas of the slab, and shaped to receive the raised, opposed areas on the inner surfaces of the bifurcated portions of the handle, when the bifurcated portions of the handle are seated in the depressed areas, thereby forming an interlock between the handle and slab so that the bifurcated portions cannot be slid out of the depressed areas without deflecting and spreading the portions,
j. a channel through the depressed areas communicating between the edge of the slab and the passage,
k. the channel being narrower than the passage, to permit the insertion of the raised areas into the passage.

* * * * *